United States Patent
Takada

(10) Patent No.: US 10,636,152 B2
(45) Date of Patent: Apr. 28, 2020

(54) SYSTEM AND METHOD OF HYBRID TRACKING FOR MATCH MOVING

(71) Applicant: GVBB HOLDINGS S.A.R.L., Luxembourg (LU)

(72) Inventor: Yousuke Takada, Kobe (JP)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 77 days.

(21) Appl. No.: 15/811,995

(22) Filed: Nov. 14, 2017

(65) Prior Publication Data

US 2018/0137632 A1    May 17, 2018

Related U.S. Application Data

(60) Provisional application No. 62/422,429, filed on Nov. 15, 2016.

(51) Int. Cl.
*G06T 7/262* (2017.01)
*G06K 9/00* (2006.01)
(Continued)

(52) U.S. Cl.
CPC .......... *G06T 7/262* (2017.01); *G06K 9/00228* (2013.01); *G06K 9/00261* (2013.01);
(Continued)

(58) Field of Classification Search
CPC ........... G06K 9/00228; G06K 9/00261; G06K 9/00335; G06K 9/00718; G06K 9/4604;
(Continued)

(56) References Cited

U.S. PATENT DOCUMENTS

| | | | |
|---|---|---|---|
| 7,899,208 B2 | 3/2011 | Kondo et al. | |
| 8,649,555 B1 * | 2/2014 | Bregler | G06K 9/00624 382/100 |

(Continued)

FOREIGN PATENT DOCUMENTS

| | | |
|---|---|---|
| EP | 2141450 A1 | 4/2011 |
| EP | 2725549 A1 | 4/2014 |
| EP | 2726816 B1 | 10/2017 |

OTHER PUBLICATIONS

Möller, Birgit et al., "Detection and Tracking of Moving Objects for Mosaic Image Generation," Joint Pattern Recognition Symposium. Springer Berlin Heidelberg, 2001.

(Continued)

*Primary Examiner* — Mekonen T Bekele
(74) *Attorney, Agent, or Firm* — Arent Fox LLP

(57) ABSTRACT

A system and method that maximizes tracking speed of an object in a sequence of images by selecting a technique for tracking the object independently for each frame in a video. The system includes an object feature detector that detects object features in a reference frame of the video and a feature comparator that determines a number of object features in each frame in the sequence of images that match the detected object features in the reference frame. Moreover, a tracking pattern selector selects the type of object tracking to track the object in the current frame based on the determined matched object features between the reference frame and the current frame of the video.

18 Claims, 7 Drawing Sheets

(51) Int. Cl.
    *G06T 7/20*       (2017.01)
    *G06T 7/246*     (2017.01)
    *G06T 3/00*       (2006.01)
    *H04N 5/262*     (2006.01)
    *G06K 9/46*       (2006.01)
    *G06T 13/00*     (2011.01)
    *G06K 9/62*       (2006.01)
    *G06K 9/68*       (2006.01)
    *G06K 9/32*       (2006.01)

(52) U.S. Cl.
CPC ..... *G06K 9/00335* (2013.01); *G06K 9/00718* (2013.01); *G06K 9/00744* (2013.01); *G06K 9/4604* (2013.01); *G06K 9/6202* (2013.01); *G06K 9/685* (2013.01); *G06T 3/00* (2013.01); *G06T 7/20* (2013.01); *G06T 7/246* (2017.01); *G06T 7/248* (2017.01); *G06T 13/00* (2013.01); *H04N 5/262* (2013.01); *G06K 2009/3291* (2013.01); *G06T 2207/10016* (2013.01); *G06T 2207/10024* (2013.01); *G06T 2207/10028* (2013.01); *G06T 2207/30201* (2013.01)

(58) Field of Classification Search
CPC ................ G06K 9/6202; G06K 9/685; G06K 2009/3291; G06K 9/00483; G06K 19/06028; G06T 13/00; G06T 7/20; G06T 7/246; G06T 7/248; G06T 7/262; G06T 2207/10016; G06T 2207/10024; G06T 2207/10028; G06T 2207/30201; G06Q 20/401; B42D 25/23
See application file for complete search history.

(56) References Cited

U.S. PATENT DOCUMENTS

| | | | |
|---|---|---|---|
| 8,718,324 B2 | 5/2014 | Fan | |
| 9,147,260 B2* | 9/2015 | Hampapur | G06T 7/277 |
| 9,741,129 B2* | 8/2017 | Holtz | G01S 3/7865 |
| 2003/0012410 A1 | 1/2003 | Navab et al. | |
| 2008/0080739 A1* | 4/2008 | Muramatsu | G03B 35/18 382/103 |
| 2009/0022401 A1* | 1/2009 | Huang | A61B 5/1171 382/190 |
| 2010/0097457 A1 | 4/2010 | Zhang et al. | |
| 2011/0150280 A1* | 6/2011 | Tsuji | G06T 7/248 382/103 |
| 2012/0154579 A1* | 6/2012 | Hampapur | G06T 7/215 348/143 |
| 2013/0002866 A1* | 1/2013 | Hampapur | G06T 7/215 348/143 |
| 2013/0050516 A1* | 2/2013 | Hojo | H04N 5/23254 348/208.6 |
| 2013/0088600 A1 | 4/2013 | Wu et al. | |
| 2013/0278778 A1* | 10/2013 | Kagei | H04N 5/232 348/169 |
| 2014/0320691 A1* | 10/2014 | Zhu | G06K 9/00335 348/222.1 |
| 2015/0172626 A1 | 6/2015 | Martini | |
| 2017/0367766 A1* | 12/2017 | Mahfouz | A61B 34/10 |
| 2019/0049549 A1* | 2/2019 | Tang | G01S 5/28 |

OTHER PUBLICATIONS

Siebel, Nils T. et al., "Fusion of Multiple Tracking Algorithms for Robust People Tracking," European Conference on Computer Vision. Springer Berlin Heidelberg, 2002.

Ladikos, Alexander et al., "A Real-Time Tracking System Combining Template-Based and Feature-Based Approaches," Department of Computer Science, Technical University of Munich, Boltzmannstr, 2007.

Kusuma, Gede Putra et al., "Hybrid Feature and Template Based Tracking for Augmented Reality Application," Visual Computing Department. Institute for Infocomm Research, 2015.

* cited by examiner

SYSTEM AND METHOD OF HYBRID TRACKING FOR MATCH MOVING

This application claims priority to U.S. Patent Provisional Application No. 62/422,429, filed Nov. 15, 2016, the entire contents of which are hereby incorporated by reference.

TECHNICAL FIELD

The system and method disclosed herein generally relate to video editing, and, more particularly, to a system and method of hybrid tracking for match moving.

BACKGROUND

Existing computer systems are capable of performing object detection in a video image, i.e., identifying an object in an image (e.g., a frame of a video sequence). These systems are also capable of tracking such images including, for example, tracking the movement of a human face (i.e., the object or feature) in a sequence of frames of video that a computer system camera is recording or has recorded.

In video editing, object tracking refers to interactive motion analysis in which a user-specified feature (i.e., an image patch) is tracked over time and the estimated motion (e.g., affine or projective) is then applied to some target image or visual effect so that it "match moves" to the tracked feature. Match moving is considered a cinematic technique that allows the insertion of computer graphics into live-action footage with correct position, scale, orientation, and motion relative to the objects in the frames of the video sequence.

Conventionally, there have been many motion analysis techniques proposed, such as template matching according to the Lucus-Kanade method (identified below). Of such motion analysis techniques, template-based (or pixel-based) tracking algorithms are the most widely used for tracking objects in frames of a video sequence. However, since the computational complexity of the template tracker is roughly proportional to the area of the feature, the template tracker will slow significantly as it tracks large features, i.e., larger object with more pixels.

On the other hand, corner tracking methods estimate motion from sparse point correspondences so that the complexity of these algorithms can be capped by the maximum number of corners to track N_max (e.g., 256). However, corner tracking method fails to reliably track small or textureless features where it cannot detect a sufficient number of corners.

Hybrid tracking systems have been developed that use both corner based and template based tracking algorithms to improve accuracy and stability of the tracked object in the video sequence. For example, one existing hybrid tracking design is disclosed in "Hybrid Feature and Template Based Tracking for Augmented Reality Application" to Kusuma et al.; Asian Conference on Computer Vision (ACCV) (2014) (hereinafter "Kusuma"). In Kusuma, a hybrid tracking algorithm is disclosed for performing corner tracking followed by template tracking to maximize tracking accuracy and stability. However, Kusuma's system consumes significant computing resources by performing two separate tracking processes in sequence. Moreover, in "A Real-Time Tracking System Combining Templated-Based and Feature-based Approaches" to Ladikos et al., *International Conference on Computer Vision Theory and Applications* (2007) (hereinafter "Ladikos"), a hybrid tracking design is proposed that switches between the tracking algorithms, but only makes the decision to switch after having performed one of the tracking algorithms identified by some means. Each of the designs in Kusuma and Ladikos are overly complicated and consume significant computing resources, leading to slow tracking speeds.

In particular, to implement the tracking processes, these hybrid tracking systems require a finite state machine to identify the current tracking state as well as some appropriate switching algorithm to switch between the tracking algorithms. For example, the tracking system in Ladikos uses the current state of the finite state machine to check if its base tracker (i.e., template based tracking) is accurately tracking an object based on complicated criteria. If the ongoing template tracking is not accurately tracking an object, Ladikos's algorithm switches to corner based tracking. Although it is possible that Ladikos's algorithm may perform fast tracking if the finite state machine is very accurate, providing such a finite state machine will not only complicate the design of a hybrid tracking system, but also consume computing resources. Moreover, even with an accurate finite state machine, the tracking speeds of Ladikos's algorithm will still slow down significantly when tracking a complicate video sequence containing large motion, for example, where the tracker switching must occur frequently between template tracking to corner tracking and back to template tracking and the like. These types of tracking scenarios, which are not uncommon, increase the switching overhead and slows down the overall tracking.

Accordingly, what is needed is a tracking system and method for match moving that increases tracking speed while minimizing consumption of computing resources.

SUMMARY

Thus, according to an exemplary embodiment, a hybrid tracking system is disclosed for tracking an object in video. In one exemplary aspect, a video system for maximizing tracking speed of an object is provided with the system including a camera configured to generate an image frame, and an object pattern tracker having a pattern detector configured to detect a pattern feature of an object in the image frame. In this embodiment, the object pattern tracker has a detected pattern feature processor configured to determine whether the detected pattern feature of the object exceeds a predetermined object pattern threshold level. Moreover, the object pattern tracker is configured to apply a first type of video tracking to the object when the detected pattern feature of the object does not exceed the predetermined object pattern threshold level to achieve a first tracking object speed of the object. Furthermore, the object pattern tracker is configured to apply a second type of video tracking to the object when the detected pattern feature of the object exceeds the predetermined object pattern threshold level to achieve a second tracking object speed of the object. Yet, further in this aspect, the detected pattern feature of the object comprises a corner pattern of the object, the second type of video tracking comprises corner based tracking of the object, and the first type of video tracking comprises template based tracking of the object.

In one refinement of this aspect, the corner based tracking of the object comprises corner tracking of the object in a current frame to generate position data of the object. In another aspect, the template based tracking of the object comprises template tracking of the object in a current frame to generate position data of the object.

In another aspect, a video system is provided for maximizing tracking speed and display of an object. In this aspect, the system includes a camera configured to generate an image frame, and an object pattern tracker having an object pattern detector configured to detect a pattern feature of an object in the image frame. Furthermore, the object pattern tracking has a detected pattern feature processor configured to determine whether the detected pattern feature of the object exceeds a predetermined object pattern threshold level. In this aspect, the object pattern tracker is configured to apply a first type of video tracking to the object when the detected pattern feature of the object does not exceed the predetermined object pattern threshold level to achieve a first tracking object speed of the object, and the object pattern tracker is configured to apply a second type of video tracking to the object when the detected pattern feature of the object exceeds the predetermined object pattern threshold level to achieve a second tracking object speed of the object.

In a refinement of this aspect, the detected pattern feature of the object comprises a corner pattern of the object. Moreover, the second type of video tracking comprises corner based tracking of the object and the first type of video tracking comprises template based tracking of the object. Yet further, in one aspect, the corner based tracking of the object comprises corner tracking of the object in a current frame to generate position data of the object, and the template based tracking of the object comprises template tracking of the object in a current frame to generate position data of the object.

In yet another aspect, the object pattern tracker is configured to apply the first type of video tracking to the object to track the object at the first tracking speed being faster than the second tracking speed when the detected pattern feature of the object does not exceed the predetermined object pattern threshold level. Similarly, in this aspect, the object pattern tracker is configured to apply the second type of video tracking to the object to track the object at the second tracking speed being faster than the first tracking speed when the detected pattern feature of the object does exceed the predetermined object pattern threshold level.

In another exemplary aspect, the system includes a camera configured to generate a sequence of frames of the video and electronic memory configured to store the sequence of frames of the video. Furthermore, the system includes a software processor configured to detect a number of corner features of an object in a reference frame of the video, and, if the detected number of corner features in the reference frame is greater than or equal to a predefined threshold, determine a number of corner correspondences between the detected corner features in the reference frame and corresponding corner features in a current frame of the video. The software processor is further configured to, if the number of corner correspondences is greater than or equal to the predefined threshold, perform corner based tracking of the object in the current frame to generate position data of the object, if the detected number of corner features in the reference frame or the number of corner correspondence is less than the predefined threshold, perform template based tracking of the object in the current frame to generate the position data of the object, and modify a visual characteristic of the object in the current frame based on the generated position data of the object. Finally, the system includes a display device configured to display the current frame including the object having the modified visual characteristic.

According to another exemplary embodiment, a method is provided for tracking an object in video. In one aspect, the method includes generating, by a camera, a sequence of frames of the video, storing, in electronic memory, the sequence of frames of the video. Furthermore, the method includes detecting, by a software processor, a number of corner features of an object in a reference frame of the video, and, if the detected number of corner features in the reference frame is greater than or equal to a predefined threshold, determining, by the software processor, a number of corner correspondences between the detected corner features in the reference frame and corresponding corner features in a current frame of the video. Furthermore, if the number of corner correspondences is greater than or equal to the predefined threshold, the method includes performing, by the software processor, corner based tracking of the object in the current frame to generate position data of the object. In contrast, if the detected number of corner features in the reference frame or the number of corner correspondence is less than the predefined threshold, the method includes performing, by the software processor, template based tracking of the object in the current frame to generate the position data of the object. Finally, the exemplary method includes modifying a visual characteristic of the object in the current frame based on the generated position data of the object, and displaying, by a display device, the current frame including the object having the modified visual characteristic.

According to another exemplary embodiment, a video system is provided for maximizing tracking speed of an object in a sequence of images by selecting a tracking type independently for each image frame in a video. In this aspect, the system includes an object feature detector configured to detect a plurality of object features in a reference frame of the video; a feature comparator configured to determine a number of object features in a current image frame in a sequence of images of the video that match the detected object features in the reference frame; and a tracking pattern selector configured to select one of a plurality of types of object tracking to track an object in the current image frame based on the determined matched object features between the reference frame and the current image frame of the video.

Moreover, in a refinement of the exemplary aspect, the tracking pattern selector is further configured to select the one of the plurality of types of object tracking to track the object by comparing a number of the determined matched object features to a predetermined object pattern threshold level. In this aspect, the tracking pattern selector selects a first type of object tracking of the plurality of types of object tracking when the number of determined matched objects does not exceed the predetermined object pattern threshold level to achieve a first tracking object speed of the object, and the tracking pattern selector selects a second type of object tracking of the plurality of types of object tracking when the number of determined matched objects exceeds the predetermined object pattern threshold level to achieve a second tracking object speed of the object.

In another exemplary aspect, the tracking pattern selector is further configured to compare a number of the detected plurality of object features in the reference frame to a minimum detected feature threshold and to automatically select the first type of object tracking to track the object in the sequence of images when the number of detected object features is less than the minimum detected feature threshold. Moreover, in one aspect, the tracking pattern selector selects the one type object tracking for each image frame independently of the selected type of object tracking for a previous image frame in the sequence of images of the video.

Furthermore, in an exemplary aspect, the video system, further includes an object position determiner configured to generate position data of the tracked object based on the selected type of object tracking; and a current tracking output configured to output the sequence of images of the video and the generated position data for the tracked object to a digital video editor to modify the tracked object in the video using the generated position data.

The above simplified summary serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
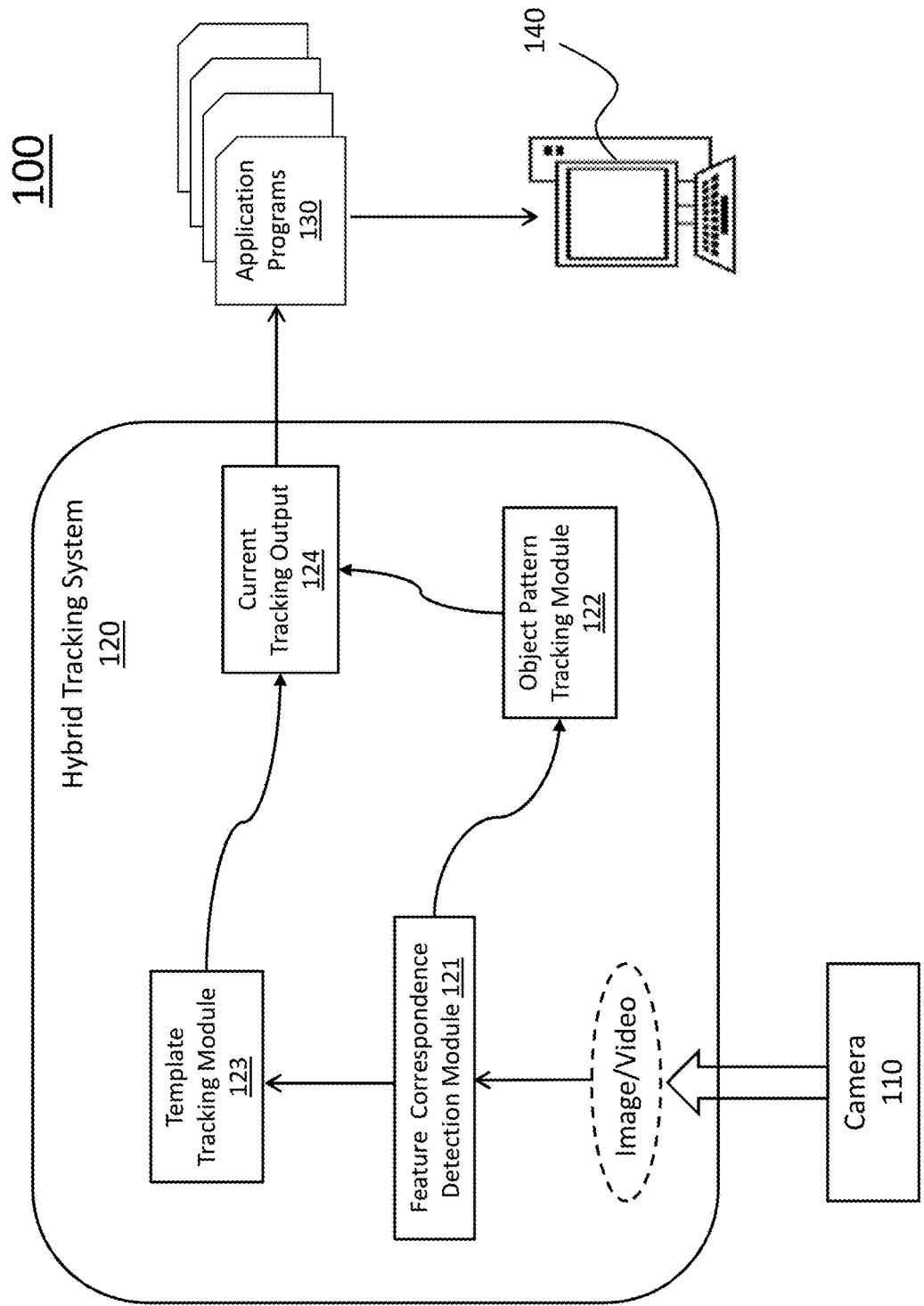
FIG. 1 illustrates a block diagram of a system of hybrid tracking for match moving according to an exemplary embodiment.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

FIG. 1 illustrates a block diagram of a system of hybrid tracking for match moving according to an exemplary embodiment. In general, the system 100 includes a camera 110, a hybrid tracking system 120, one or more application programs 130 and a video display 140. It should be appreciated that while each of these components is illustrated as a separate component of the system 100, one or more of the components can be incorporated together as part of a stand-alone computer system in an exemplary aspect.

According to the exemplary embodiment, the camera 110 can be any type of conventional digital camera that is configured to capture image data as a sequence of image frames and provide the captured digital images as image (i.e., image frames) and/or video data (i.e., video frames) to the hybrid tracking system 120. In general, the term "video file" is used to broadly refer to a sequence of image frames. Moreover, it should be appreciated that while the exemplary system is described as receiving image data from camera 110, in an alternative aspect, this image/video data can be pre-captured and stored as an electronic data file in computer memory (not shown), which can be part of hybrid tracking system 120, for example. Then during the video editing process, the capture image/video data (i.e., the video file) is provided to hybrid tracking system 120.

The details of an exemplary computer system configured to implement the hybrid tracking system 120 will be described in detail below with respect to FIG. 5. However, as shown in FIG. 1, the hybrid tracking system 120 includes a number of "modules" configured to perform the hybrid tracking algorithms described herein. As used herein, the term "module" can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. Moreover, each module can also be implemented as a combination of the two or more modules, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Thus, according to the exemplary aspect, the hybrid tracking system 120 a central processing unit ("CPU") provided to execute a plurality of modules including a feature correspondence detection module 121, an object pattern tracking module 122 and a template tracking module 123. Each module can include or be comprised of software code (e.g., processor executable instructions) in memory, which may be configured to execute/facilitate the corresponding algorithms as will be described herein. Moreover, the object pattern tracking module 122 and the template tracking module 123 can be implemented as separate components/modules or as a single object tracker (e.g., an object pattern tracker) that is configured to execute the multiple types of object tracking as disclosed herein.

As shown, the hybrid tracking system 120 includes feature correspondence detection module 121 (also considered an object feature detector and/or feature comparator) that receives a reference frame of the video data and is configured to detect objects features (i.e., reference points or features or corners) over a specified region in the reference frame. In one aspect, the reference frame is simply the first frame in the sequence of frames of the video file. The features (e.g., corners) are detected using known techniques and are identified as strong or stable features in the reference frame. For example, in one aspect, the features are detected using the method described in "Good Features to Track" to Shi et al., *IEEE Conference on Computer Vision and Pattern Recognition*, pp. 593-600 (1994) (hereinafter "Shi"), the contents of which are hereby incorporated by reference. Moreover, in one aspect, the specified region can be the entire frame, although the specified region can be a subset of the pixels in the reference frame according to another aspect. For example, the reference frame can be divided into a plurality of region (e.g., on an N×M pixel basis) and the feature correspondence detection module 121 can be configured to detect features of an object (e.g., detected "corners" of a person's face) in the reference frame within one or more of the specified regions. Moreover, the objects or features to be identified in the frame or specified region can be user-specified (e.g., by a user of the editing software), identified automatically based on the editing software or the like.

Once the total number of features are extracted for a given object in the reference frame, this total number is compared with a predetermined/predefined threshold N_min (i.e., a minimum detected feature threshold), which can be, for example, 32 or 64 features and can be set by the video editor. If the feature correspondence detection module 121 determines that the number of features is above the predetermined threshold N_min, the feature correspondence detection module 121 will then perform a feature detection of a current frame of the video file to detect feature correspondence (e.g., a feature correspondence of matching features, which can have a fault tolerance threshold, for example) between the reference frame and each current frame of the sequence of frames of the video. The number of detected feature correspondences (i.e., matches) between the reference frame and the current frame will determine whether the hybrid tracking system 120 initiates object pattern based tracking or template based tracking of the object. This, in an exemplary aspect, the feature correspondence detection module 121 can include a tracking pattern selector that select one of the types of object tracking by comparing the number of the determined corresponding object features to a predetermined object pattern threshold level, as will be discussed in detail below. Moreover, it should be appreciated that since feature correspondence detection using techniques such as the Lucas-Kanade method may fail to find certain feature correspondences between the current frame and the reference frame, the number of detected features correspondences N will always be equal to or less than the number of detected features in the reference frame.

In any event, once the number of feature correspondences between the reference frame and the current frame is determined, this number is compared against the predetermined threshold N_min (i.e., a predetermined object pattern threshold level). The predetermined threshold can be set by a system designer and stored in advance in memory of the tracking system, for example. If the number of feature correspondences is greater than this threshold, the hybrid tracking system 120 is configured to initiate the object pattern tracking module 122 to begin tracking the object in the video data. According to the exemplary embodiment, the hybrid tracking system 120 uses the object pattern tracking module 122 as the first or "default" tracking module to track the object in the video image assuming the above-noted conditions are satisfied. It should be appreciated that while the object pattern tracking module 122 uses feature or corner based tracking as will be described in detail below, this first tracking module can perform other types of tracking algorithms as would be appreciated to one skilled in the art. As will be described in detail below, the selection of the tracking algorithm is based on whether the number of features in an object exceeds a predetermined threshold level.

Moreover, during feature tracking, the feature correspondence detection module 121 is configured to continually perform the feature correspondence detection between the reference frame and each subsequent frame in the sequence of video frames. If at any time the feature correspondence detection module 121 determines that the number of detected corresponding features between the reference frame and the current frame falls below the predetermined threshold N_min, the hybrid tracking system 120 will initiate the template tracking module 122 to begin/continue tracking the object in the video data received from camera 110. Thus, according to this exemplary aspect, the feature correspondence detection module 121 and/or the object pattern tracking module 122 continually analyze each frame against the reference frame to detect the number of feature correspondences of the object and compare this number with the predetermined threshold N_min. Moreover, according to the exemplary aspect, the same reference frame is used throughout the analysis of the sequence of video frames. However, in an alternative embodiment, the feature correspondence detection module 121 can be configured to update the reference frame by periodically replacing the reference frame with one or more frames in the sequence of video frames. For example, after a current frame is deemed to have a sufficient number of feature correspondences with the reference frame, the feature correspondence detection module 121 can replace the original reference frame with the current frame as a new reference frame.

Importantly, the hybrid tracking system 120 determines which tracking module to initiate (the object pattern tracking module 122 or the template tracking module 123) before the system begins actually tracking the object for each frame in the sequence of video frames. This is done by comparing the number of detected features (e.g., corners) in the reference frame with the predetermined threshold N_min and then also comparing the feature correspondences between the reference frame and current frame with the predetermined threshold N_min. In the exemplary aspect, the comparison between of the feature correspondences with the predetermined threshold N_min can be performed independently of the previous frames. In order words, the type of pattern tracking technique is selected independently for each image frame in the sequence of frames and not based on the type of tracking for the previous frame in the video. In contrast, as described above, conventional hybrid tracking systems perform a complete tracking procedure using either feature based tracking or template based tracking depending on a current state of a finite state machine. Only after the particular tracking algorithm is initiated will such a conventional hybrid tracking system switch to the other of the tracking algorithms. According to the exemplary embodiment, by first determining the type of tracking algorithm to be used by determining the number of features (e.g., detected corners) and comparing it to a threshold, the exemplary hybrid tracking system 120 does not require a finite state machine to continue tracking as described above. As a result, consumption of computing resources, such as CPU usage and memory usage, are reduced by the hybrid tracking system 120 of the exemplary embodiment, which in turn will result in significant increases in tracking speed, especially in instances where the hybrid tracking system 120 is tracking a complicate video sequence containing large motion and the system 120 is required to switch between tracking algorithms frequently based on the movement and size of the object in the sequence of video frames.

When the feature correspondence detection module 121 determines that the number of features is above the predetermined threshold N_min, the hybrid tracking system 120 initiates the object pattern tracking module 122 to begin tracking the object in the video data. It should be appreciates that the hybrid tracking system 120 is configured to track the object using any existing feature/pattern based tracking system, such as corner based tracking. For example, according to one exemplary aspect, the object pattern tracking module 122 is configured as a Lucas-Kanade feature tracker, for example, as described in "An Iterative Image Registration Technique with an Application to Stereo Vision" to Lucas et al., *Proceedings of Imaging Understanding Workshop*, pp. 121-130 (1981) (hereinafter "Lucas-Kanade"), the contents of which are hereby incorporated by reference. In this aspect, the object pattern tracking module 122 uses optical flow to find sparse point correspondences between the reference frame (and detected corners/features) and each current frame received as part of the video data (e.g., a video sequence from camera 110 or memory). The object pattern tracking module 122 is configured to estimate motion of the detected feature between the two frames (i.e., the reference frame and each current frame). For example, the object pattern tracking module 122 performs a RANSAC-type sampling step to find an initial estimate of the motion from the sampled corners/features and then refines the estimated motion by optimizing a robust probabilistic motion model of sparse corners. In one aspect, the object pattern tracking module 122 can perform RANSAC-type sampling step according to "Image Alignment and Stitching: A tutorial" to Szeliski, *Foundations and Trends in Computer Graphics and Vision*, 2(1), pp. 1-104 (2006) (hereinafter "Szeliski"), the contents of which are hereby incorporated by reference.

Moreover, during processing of the video data, the sampling step is iterated as many times as the probability that the object pattern tracking module 122 determines at least one outlier-free sample becomes sufficiently close to one. Finally, the model that best fits the detected correspondences in terms of the model evidence is selected among the samples. For example, in one aspect, the object pattern tracking module 122 can select the model as described in "Pattern Recognition and Machine Learning" to Bishop, *Springer* (2006) (hereinafter "Bishop"), the contents of which are hereby incorporated by reference. In one exemplary aspect, the object pattern tracking module 122 can also perform model selection among several motion models that differ in the number (or the dimensionality) of the motion parameters, such as the translation, similarity, affine, and projective models with increasing complexity, as described in Szeliski, for example.

As the object pattern tracking module 122 continues to identify and track features in each frame of the video data, the object pattern tracking module 122 transfers the identified location (i.e., the generated position data of the tracked object), orientation and other tracked information (i.e., tracking based information) of the object to current tracking output 124, where the information can be stored in electronic memory (e.g., RAM) before it can then be transferred to one or more application programs 130.

According to the exemplary aspect, the one or more application programs 130 (e.g., a digital video editor) are provided to use the tracking based information received from the hybrid tracking system 120 to perform one or more processes (e.g., digital video effects, image editing or the like) using this information to manipulate the video data before it is presented on display device 140 as a visual-based application, which shows a modified tracked object in the video in one exemplary aspect. For example, if the object or feature being tracked is a person and the application program 130 is designed to hide the identity of the person, the application program 130 will modify the image/video to blur the person's face and conceal his or her identity. In another example, the user of the video editing software may desire a creative effect, such as providing a color correction to a specific region for aesthetic purposes. In any such examples, once the application program 130 uses the tracked information from current tracking output 124, the modified video data is provided to display device 140 for display thereon. It should be appreciated that the display device 140 can be a computer system, television, monitor, or any other type of electronic display device as would be understood to one skilled in the art.

In any event, referring back to the feature correspondence detection module 121, as image data (e.g., frames) are continually received and processed, as part of a video frame sequence, for example, the feature correspondence detection module 121 continues to calculate the number of feature correspondences between each current frame and the reference frame and compare this number against the predetermined threshold N_min. If the number of detected feature correspondences falls below the predetermined threshold N_min, the hybrid tracking system 120 will "fall back" to the second or "fall back" tracking algorithm, which, for example, can be implemented by a template tracking module 123 that begins tracking the object in the video data received from camera 110.

Thus, according to the exemplary embodiment, the second tracking module is template tracking module 123, which is configured to directly find motion between the reference frame and the current frames using, for example, normalized cross-correlation or "NCC" for estimating approximate (translational) motion. For example, in one aspect, the template tracking module 123 uses NCC to estimate approximate (translational) motion as described in "Fast Template Matching" to Lewis, Vision Interface 95, Canadian Image Processing and Pattern Recognition Society, pp. 120-123 (2006) (hereinafter "Lewis"), the contents of which are hereby incorporated by reference. Moreover, this estimated motion is followed by parametric optical flow refinement, as described in Szeliski, for example, to obtain full affine or projective motion of the object in the video data. In one exemplary aspect, the template tracking module 123 is configured to calculate the NCC with a Fast Fourier Transform ("FFT")-based correlation algorithm whose complexity is roughly proportional to the area of the tracked feature. Unlike a sparse optical flow motion estimation algorithm (e.g., Lucas-Kanade algorithm), the parametric optical flow assumes an affine or projective motion model and optimizes the parameters of the motion model by employing a robust probabilistic optical flow model. In the exemplary aspect, the probabilistic model is similar to that of the algorithm executed by the object pattern tracking module 122 except that it directly models image pixels (i.e., gray values) rather than sparse corners tracked between images. The template tracking module 123 works well even for small features because it can fully utilize the available image information, but the complexity of motion estimation is proportional to the feature area.

According to the exemplary aspect, it should be appreciated that the tracker or tracking algorithm is based on detected features in the reference frame and feature correspondences between the reference frame and the current frame. Thus, in this aspect, the system and method is detected an object pattern and comparing this pattern with a predetermined threshold level. Accordingly, based on the comparison result, the hybrid tracking system 120 then selects the tracker that is faster or fastest for tracking the object for the given image frame. In other words, after the comparison result, the hybrid tracking system 120 is configured to select the first tracker (e.g., the corner or feature based tracker) as opposed to the second tracker (e.g., template based tracker) because the first tracker will tracker the object in the current frame faster than the second tracker. This process can then be repeated for each frame in the sequence of the video file.

Figure 2A:
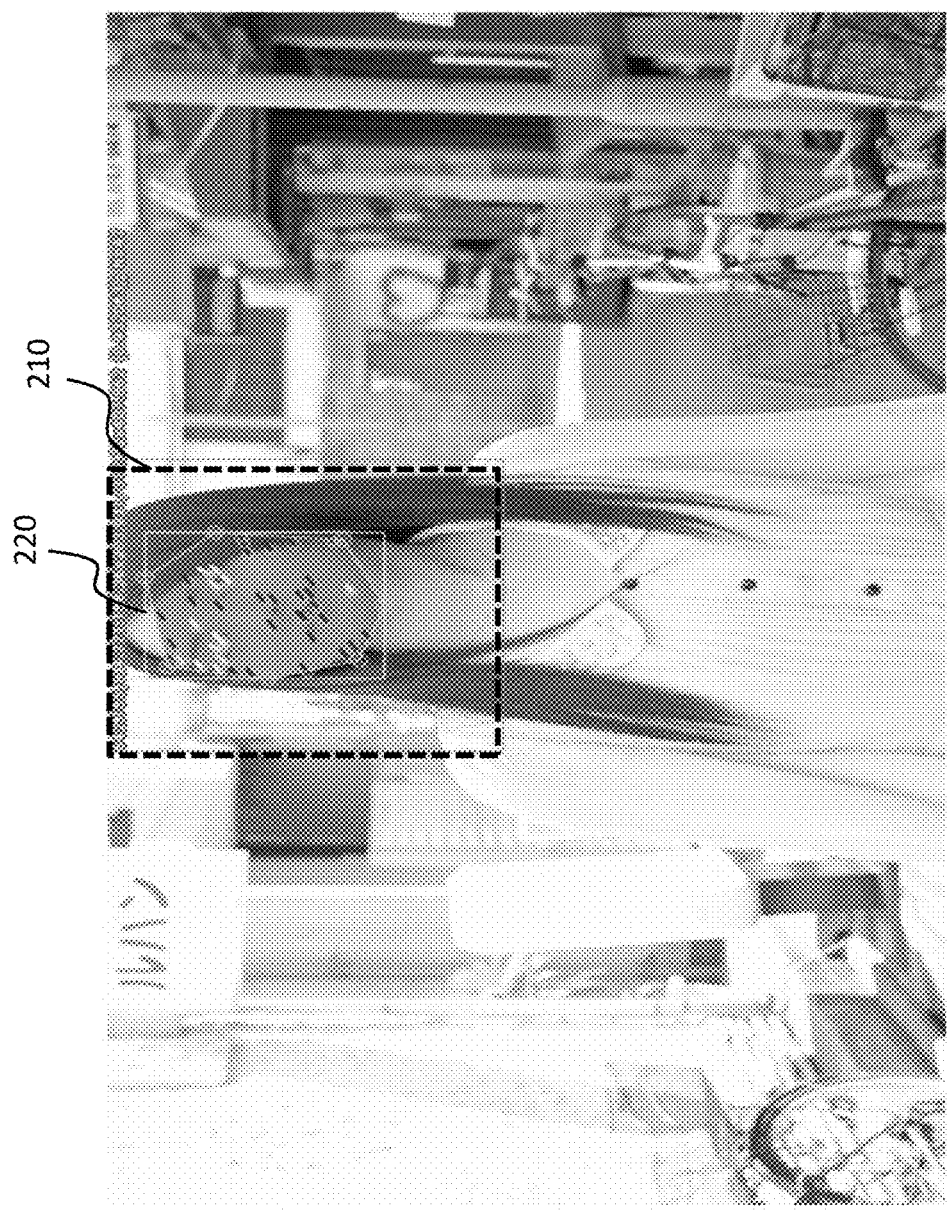
FIG. 2A illustrates an exemplary reference frame analyzed by the feature correspondence detection module according to an exemplary aspect.

FIG. 2A illustrates an exemplary reference frame analyzed by the feature correspondence detection module 121 according to an exemplary aspect. In this example, the reference frame includes a specified region 210 and an object to be tracked 220, which, according to the example is the face of a woman and can be designated by a user. As described above, the feature correspondence detection module 121 is configured to identify and count the number of features identifiable in the detected and tracked object 220.

Figure 2B:
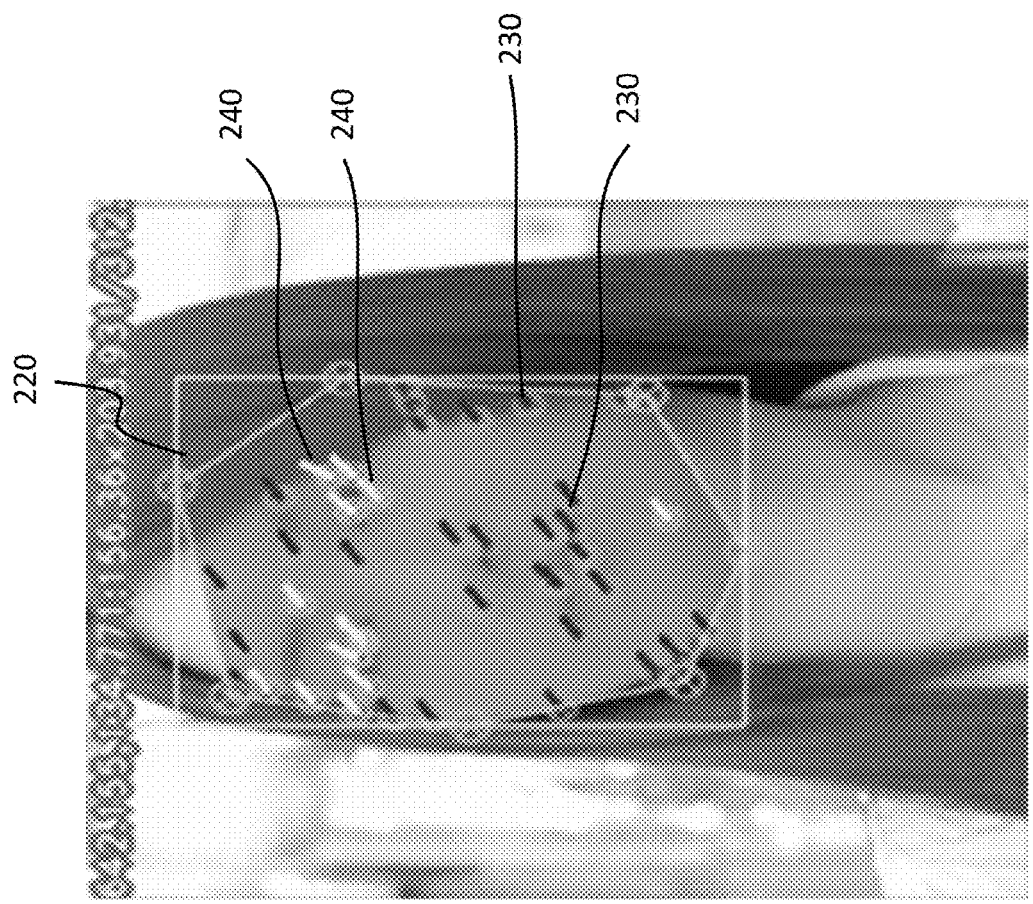
FIG. 2B illustrates an expanded view of the exemplary reference frame illustrated in FIG. 2A.

FIG. 2B illustrates an expanded view of the exemplary reference frame illustrated in FIG. 2A. As shown in this example, the feature correspondence detection module 121 detects a plurality of inliers shown with black vectors (e.g., inliers 230) and a plurality of outliers with white vectors (e.g., outliers 240). In this example, the feature correspondence detection module 121 has detected a total of 47 corners (i.e., features). Moreover, as described above, this number of detected corners is compared against the predetermined threshold N_min to determine whether the object tracking should be performed by object pattern tracking module 122 or template tracking module 123, as discussed above.

Figure 3A:
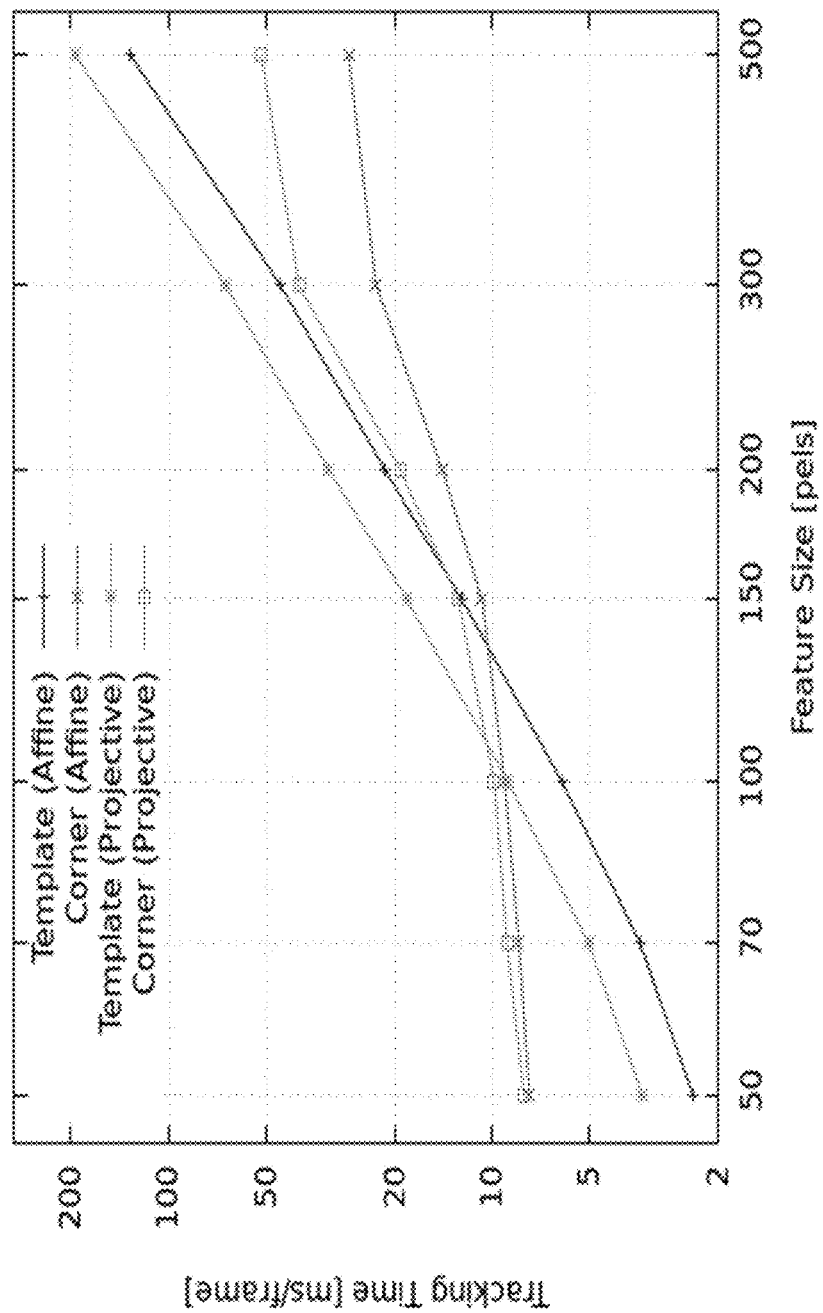
FIG. 3A illustrates a graph illustrating a simulated comparison of feature size vs. tracking time using the exemplary tracking modules.

To highlight the technical advantages of the exemplary hybrid tracking system disclosed herein, FIG. 3A illustrates a graph illustrating a simulated comparison of feature size vs. tracking time using the exemplary tracking modules. As shown, the graph illustrates affine and projective tracking using the object pattern tracking module 122 and the template tracking module 123 disclosed herein.

In this example, the graph compares features size in pixels (i.e., "pels") to tracking time in milliseconds (ms) per frame. Moreover, the simulated results have used a 1920×1080p sequence and tracked square features of varying sizes without updating the mask shape. As shown, the exemplary feature sizes are 50×50, 70×70, 100×100, 150×150, 200× 200, 300×300, and 500×500 in pixels. It should be appreciated that the performance of the tracking modules is largely dependent on the image content, but that this graph illustrates a typical result. As can be seen, the tracking times using the object pattern tracking module 122 are significantly higher for small tracked object (i.e., when the feature size in pixels is below 100, for example). As the feature size increases past this threshold, the tracking time for the template tracking module 123 also increases and becomes greater than the tracking time of the object pattern tracking module 122 for the same object.

Figure 3B:
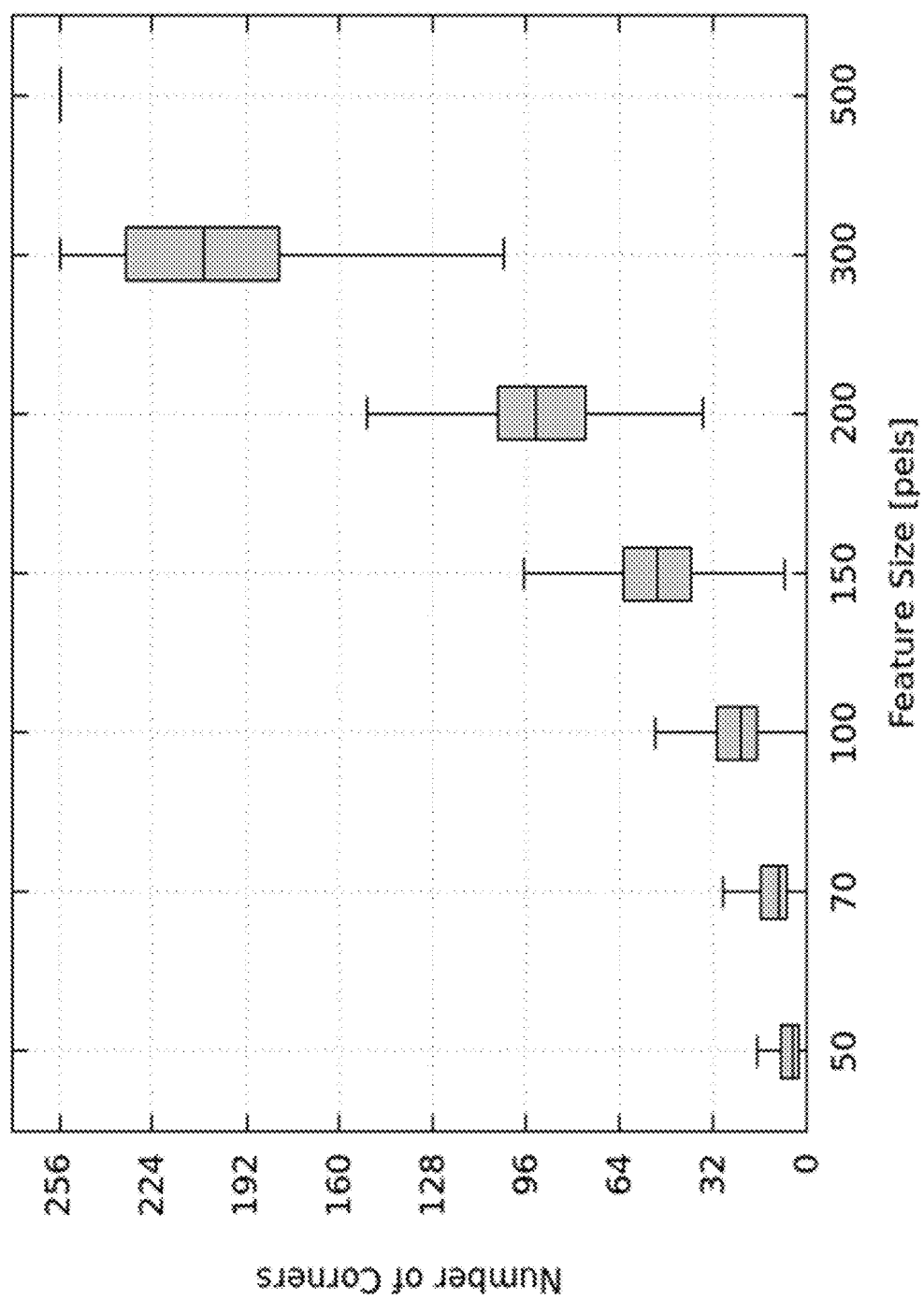
FIG. 3B illustrates a graph showing an example of the correspondence between feature size and the number of corners that are reliably tracked for each feature size.

It should be appreciated that this type of simulation can be used to help predefine the threshold N_min of detected features to control whether the object pattern tracking module 122 or template tracking module 123 is used to track an object as discussed above. FIG. 3B illustrates a graph showing an example of the correspondence between feature size and the number of corners that are reliably tracked for each feature size. As shown, as the feature size in pixels increase, the number of corners that can be reliably tracked increases. Accordingly, when collectively viewing the graphs in FIGS. 3A and 3B, it is clear that the complexity of the template tracking module 123 is roughly proportional to the area of the feature whereas that of the object pattern tracking module 122 is roughly constant as the feature size becomes large or the number of corners saturates to N_max=256. Therefore, it should be readily appreciated that the object pattern tracking module 122 is significantly faster than the template tracking module 123 for large features, but slower for small features. Thus, in the exemplary embodiment, the threshold N_min of detected features can be approximately=32 or 64, as described above.

Although the exemplary embodiment compares detected features in a reference as well as feature correspondences a predetermined threshold N_min in order to determine which tracker to use for each frame, in alternative embodiment the hybrid tracking system 120 is configured to compare the size of the tracked object (e.g., based on size in terms of pixels) with a predetermined size threshold (e.g., 150×150 pixels). If the size of the tracked object in the reference frame is greater than the predetermined size threshold, the hybrid tracking system 120 will initiate the first tracker (e.g., a feature or corner based tracker) to track the object in the current frame. Moreover, if the size of the tracked object falls below the predetermined size threshold, the hybrid tracking system 120 will "fall back" to the second tracker (e.g., a template based tracker) to track the object in the current frame.

Figure 4:
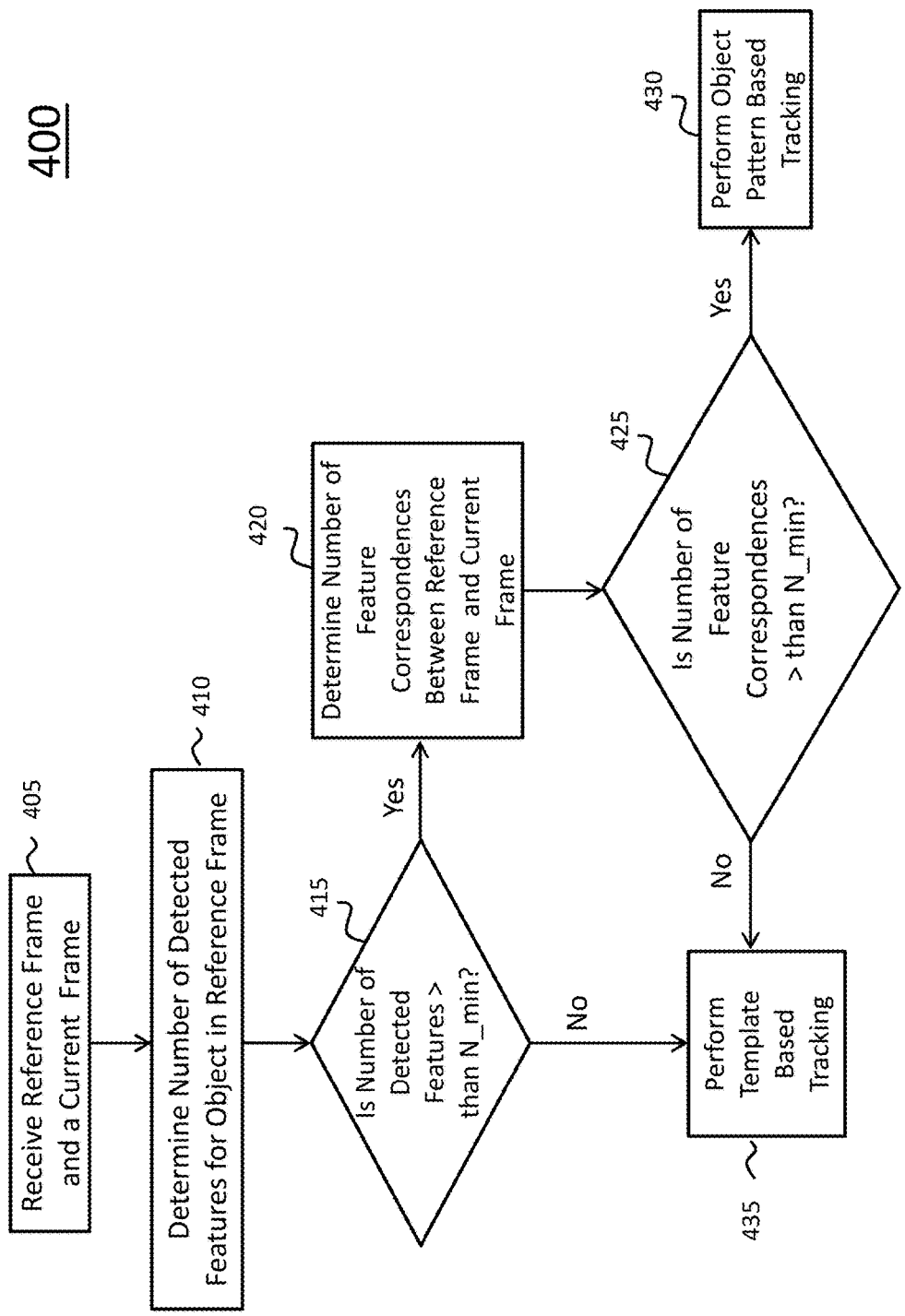
FIG. 4 illustrates a flowchart for a method of hybrid tracking for match moving according to an exemplary embodiment.

FIG. 4 illustrates a flowchart for a method of hybrid tracking for match moving according to an exemplary embodiment. As will be described in detail below, the illustrated method determines which base tracker to use before performing tracking of an object in a specified region of a sequence of frames by a simple criterion in terms of the number of detected features correspondences. In general, it is contemplated that the hybrid tracking system 120 is configured to perform a first tracking algorithm (e.g., feature based tracking) and fall back to a second tracking algorithm (e.g., template based tracking) based on the number of detected features correspondences between a reference frame and a current frame. For example, the number of detected features in a reference frame can be denoted by N. If this number of detected features N is equal to or above a predetermined threshold level, the hybrid tracking system 120 will initiate the first tracking algorithm, which can be a corner tracker, for example, that estimates motion from the detected correspondences. Alternatively, if the number of detected features N is less than the predetermined threshold level, the hybrid tracking system 120 switches (i.e., "falls back") to the second tracking algorithm, which can be the template tracker. In this instance, the hybrid tracking system 120 discards detected correspondences (if any) between the reference frame and the current frame. However, this overhead due to correspondence detection (whose computational complexity is roughly proportional to N) is negligible because N is necessarily small since the second tracking algorithm is only used when N is below the threshold level. In contrast, conventional hybrid tracking systems are able to perform a switching criteria only after a complete tracking step has first been performed as described above. The disclosed tracking algorithm significantly improves tracking speed and reduces computer system resource consumption by independently determining the tracker to be used for each frame in the video sequence.

It should be appreciated that while FIG. 4 illustrates a method that uses object pattern based tracking and template tracking as the two tracking algorithms, alternative tracking methods can be used in other embodiments. As will be described in detail below, the method importantly identifies which tracking algorithm to use on a frame by frame basis before performing the tracking object tracking for each frame. In other words, the tracking pattern selector selects the type of object tracking separately for each image frame of the plurality of images in the sequence of images in the video, such that the tracking type selection is performed independently from the previous state of the system (i.e., the selected object tracking type for the previous image frame). As a result, overall tracking speed for the object in the video sequence can be significantly improved.

In particular, as initially shown at step 405, a reference frame and a current frame of the sequence of frames is received by the exemplary hybrid tracking system 120. Next, at step 410, the feature correspondence detection module 121 analyzes the reference frame and detects the number of features (e.g., corners) in a specified region of the reference frame. For example, referring to FIG. 2B, the specified region 210 includes an object to be tracked 220, and the feature correspondence detection module 121 is configured to detect the number of feature (e.g., inliers 230 and outliers 240). In this example, the features are corners and the number of detected corners is 47. In one aspect, the feature correspondence detection module 121 detects no more than N_max features (e.g., 256 features/corners) of the object in the specified region.

As further shown, at step 415, the feature correspondence detection module 121 compares the number of detected features with a predetermined threshold N_min (e.g., 32), which can be considered a minimum detected feature threshold. In an exemplary aspect, if the number of detected object features in the reference frame is less than the predetermined threshold N_min, the tracking pattern selector of the feature correspondence detection module 121 is configured to automatically select the first type of object tracking (e.g., the template based tracking) to track the object in the sequence of images.

In the current example, since the number of detected features (i.e., 47) is greater than the predetermined threshold N_min (i.e., 32), the method proceeds to step 420 to determine a number of feature correspondences between the reference frame and the current frame. At step 425, the feature correspondence detection module 121 compares the number of feature correspondences between the reference frame and the current frame with the predetermined threshold N_min. If the number of feature correspondences satisfies this threshold, the hybrid tracking system 120 begins feature tracking (e.g., corner tracking) by object pattern tracking module 122 at step 430, as described above. Alternatively, if the number of detected feature correspondences at step 425 is determined to be less than the predetermined threshold N_min, the method proceeds to step 435 to perform template tracking by template tracking module 123 according to an exemplary embodiment.

Thus, as shown, feature based tracking can be implemented as the default tracking mechanism for hybrid tracking system 120 assuming the detected feature and feature correspondences satisfy the object feature predetermined threshold level. In one refinement of this aspect, tracking of the object will only be initiated when the number of detected features at step 415 is greater than the predetermined threshold N_min. Thus, if this predetermined threshold N_min for the detected features in the reference frame is not satisfied, the hybrid tracking system 120 will simply wait for the next reference frame to be analyzed for detectable corners. However, as shown in FIG. 4, if the predetermined threshold N_min of detected features in the reference frame is not satisfied, the method proceeds to step 435 to begin template tracking.

In either event, it should be appreciated that the hybrid tracking system and method disclosed herein is stateless in that at the algorithm illustrated in FIG. 4 is performed upon receiving every new frame of the sequence of video frames. Upon receiving each new frame, the feature correspondence detection module 121 determines the number of feature correspondences at step 420 between the reference frame and the current frame. Thus, each frame of the sequence for the video file is separately analyzed to determine whether the system should perform feature tracking or template tracking of the object in that frame. As long as the number of detected feature correspondences in each subsequent frame is greater than the predetermined threshold N_min level, the object is tracked using object pattern tracking module 122 at step 430. Once this number of detected features in a specific frame of the sequence of frames falls below the predetermined threshold N_min at step 425, the hybrid tracking system 120 falls back to template tracking at step 435.

Although not shown in FIG. 4, it is reiterated that the tracking output from either object pattern tracking module 122 or template tracking module 123 is output to one or more application programs 130. This information includes the location, size, orientation, and other relevant tracked data of the feature being tracked in the region of the video frames. As one example, the application programs 130 can then provide visual effects to the tracked object before it is output to display device 140.

Figure 5:
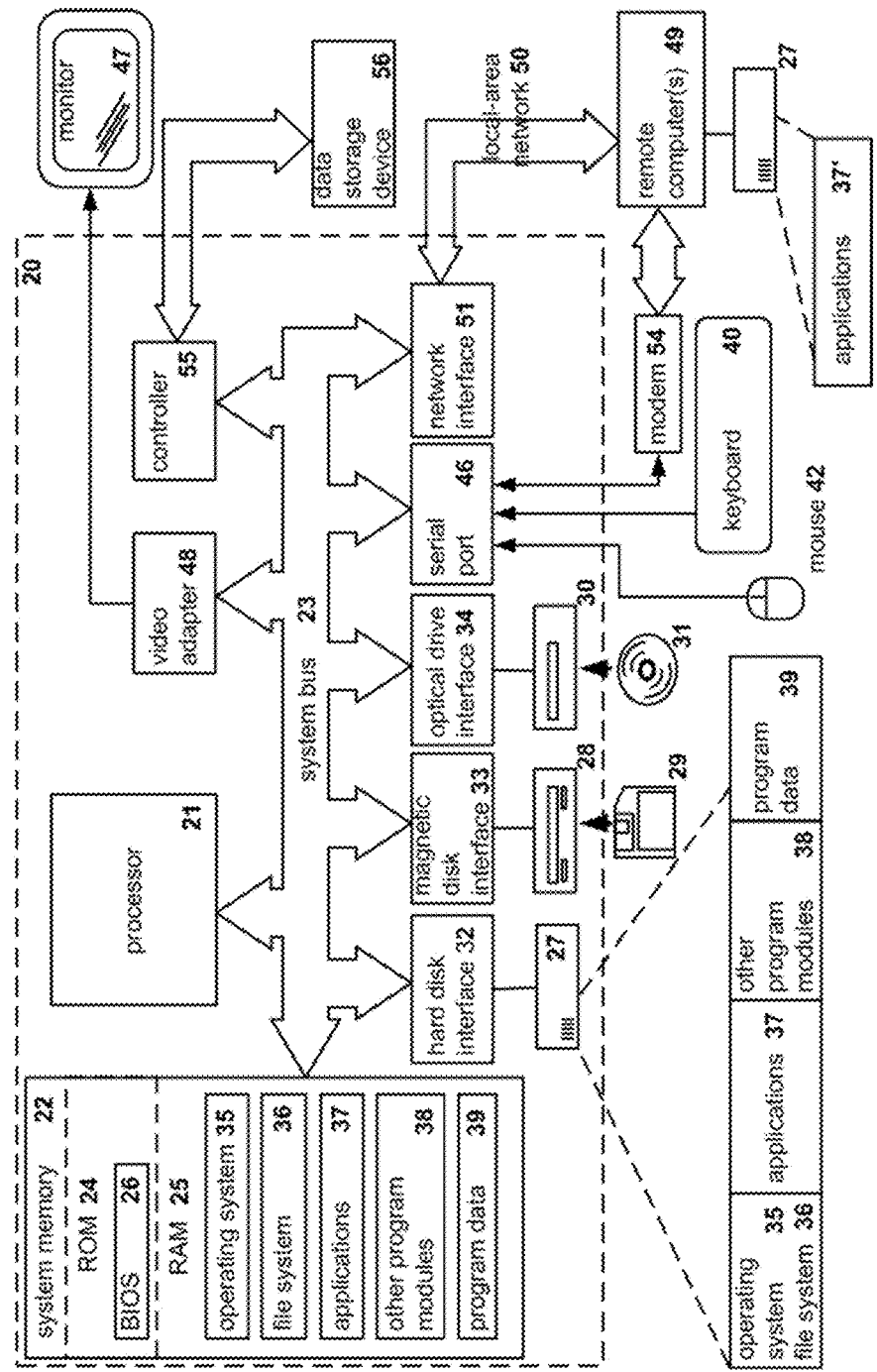
FIG. 5 illustrates an example of a general-purpose computer system (which may be a personal computer or a server) on which the disclosed systems and method can be implemented according to an example aspect.

FIG. 5 illustrates an example of a general-purpose computer system (which may be a personal computer or a server) on which the disclosed systems and method can be implemented according to an example aspect. It should be appreciated that the detailed general-purpose computer system can be provided to implement the hybrid tracking system 100 described above with respect to FIG. 1.

As shown, the computer system 20 includes a central processing unit 21, a system memory 22 and a system bus 23 connecting the various system components, including the memory associated with the central processing unit 21. For example, the computer system 20 can correspond to the hybrid tracking system 120, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides an exemplary implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. In one aspect, the program applications 37 and/or program modules 38 can correspond to the tracking module described above (i.e., feature correspondence detection module 121, object pattern tracking module 122, and template tracking module 12) as well the application programs 130

In one aspect, the user (i.e., a system administrator) is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device (corresponding to display device 140) is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes. According to one aspect, the remote computer(s) 49 can correspond to the display device 140, for example.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Moreover, while aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed:

1. A video system for maximizing tracking speed of an object in a sequence of images, the system comprising:
   a camera configured to generate a plurality of images as a sequence of images of a video;
   an object feature detector configured to detect a plurality of object features in a reference frame;
   a feature correspondence determiner configured to determine a number of corresponding object features in at least one image in the sequence of images of the video that match the detected object features in the reference frame; and
   a tracking pattern selector configured to select one of a plurality of types of object tracking by comparing a number of the determined corresponding object features to a predetermined object pattern threshold level, wherein the tracking pattern selector selects a first type of object tracking to track the object in the at least one image of the sequence of images when the determined number of corresponding object features does not exceed the predetermined object pattern threshold level to achieve a first tracking object speed of the object, wherein the tracking pattern selector selects a second type of object tracking to track the object in the at least one image of the sequence of images when the determined number of corresponding object features exceeds the predetermined object pattern threshold level to achieve a second tracking object speed of the object, wherein the detected object features in the reference frame comprises a corner pattern of the object, wherein the second type of object tracking comprises corner based tracking of the object, wherein the first type of object tracking comprises template based tracking of the object, and wherein the selecting of the one type of object tracking for each image in the sequence of images of the video by the tracking pattern selector excludes the selected type of object tracking for a previous image in the sequence of images of the video.

2. The video system of claim 1, wherein tracking pattern selector is further configured to select one of the plurality of types of object tracking separately for each image of the plurality of images in the sequence of images in the video.

3. The video system of claim 2, wherein the tracking pattern selector selects the one type object tracking for each image independently of the selected type of object tracking for the previous image in the sequence of images in the video.

4. The video system of claim 1, wherein tracking pattern selector is further configured to compare a number of the detected plurality of object features in the reference frame to a minimum detected feature threshold and to automatically select the first type of object tracking to track the object in the sequence of images when the number of detected object features is less than the minimum detected feature threshold.

5. The video system of claim 1, further comprising an object position determiner configured to generate position data of the tracked object based on the selected one type of object tracking.

6. The video system of claim 5, further comprising a current tracking output configured to output the sequence of images of the video and the generated position data for the tracked object to a digital video editor to modify the tracked object in the video using the generated position data.

7. A video system for maximizing tracking speed of an object, the system comprising:
a camera configured to generate an image frame; and
an object pattern tracker having a pattern detector configured to detect a pattern feature of an object in the image frame of a video,
wherein the object pattern tracker has a detected pattern feature processor configured to determine whether the detected pattern feature of the object exceeds a predetermined object pattern threshold level,
wherein the object pattern tracker is configured to apply a first type of video tracking to track the object in the image frame when the detected pattern feature of the object does not exceed the predetermined object pattern threshold level to achieve a first tracking object speed of the object, wherein the object pattern tracker is configured to apply a second type of video tracking to track the object in the image frame when the detected pattern feature of the object exceeds the predetermined object pattern threshold level to achieve a second tracking object speed of the object, and wherein the object pattern tracker applies one of the first and second types of video tracking to track the object in the image frame independently of a selected type of video tracking for a previous image frame in the video.

8. The system of claim 7, wherein the detected pattern feature of the object comprises a corner pattern of the object.

9. The system of claim 8, wherein the first type of video tracking comprises template based tracking of the object and the second type of video tracking comprises corner based tracking of the object.

10. The system of claim 9, wherein the corner based tracking of the object comprises corner tracking of the object in a current image frame to generate position data of the object.

11. The system of claim 10, wherein the template based tracking of the object comprises template tracking of the object in the current image frame to generate position data of the object.

12. The system of claim 11, further comprising a current tracking output configured to output the image frame and the generated position data of the tracked object to a digital video editor to modify the tracked object in the image frame using the generated position data.

13. A video system for maximizing tracking speed of an object in a sequence of images by selecting a tracking type independently for each image frame in a video, the system comprising:
an object feature detector configured to detect a plurality of object features in a reference frame of the video;
a feature comparator configured to determine a number of object features in a current image frame in a sequence of images of the video that match the detected object features in the reference frame; and
a tracking pattern selector configured to select one of a plurality of types of object tracking to track an object in the current image frame based on the determined matched object features between the reference frame and the current image frame of the video,
wherein the tracking pattern selector is further configured to select the one of the plurality of types of object tracking to track the object by comparing a number of the determined matched object features to a predetermined object pattern threshold level,
wherein the tracking pattern selector selects a first type of object tracking of the plurality of types of object tracking when the number of determined matched objects does not exceed the predetermined object pattern threshold level to achieve a first tracking object speed of the object, and
wherein the tracking pattern selector selects a second type of object tracking of the plurality of types of object tracking when the number of determined matched objects exceeds the predetermined object pattern threshold level to achieve a second tracking object speed of the object.

14. The video system of claim 13, wherein the detected object features in the reference frame comprises a corner pattern of the object.

15. The video system of claim 14, wherein first type of object tracking comprises template based tracking of the object and the second type of object tracking comprises corner based tracking of the object.

16. The video system of claim 15, wherein the tracking pattern selector is further configured to compare a number of the detected plurality of object features in the reference frame to a minimum detected feature threshold and to automatically select the first type of object tracking to track the object in the sequence of images when the number of detected object features is less than the minimum detected feature threshold.

17. The video system of claim 13, wherein the tracking pattern selector selects the one type object tracking for each image frame independently of the selected type of object tracking for a previous image frame in the sequence of images of the video.

18. The video system of claim 13, further comprising:
- an object position determiner configured to generate position data of the tracked object based on the selected type of object tracking; and
- a current tracking output configured to output the sequence of images of the video and the generated position data for the tracked object to a digital video editor to modify the tracked object in the video using the generated position data.

* * * * *